(12) United States Patent
Koh et al.

(10) Patent No.: US 11,281,381 B2
(45) Date of Patent: Mar. 22, 2022

(54) STORAGE NODE OF DISTRIBUTED STORAGE SYSTEM AND METHOD OF OPERATING THE SAME

(71) Applicants: SK hynix Inc., Gyeonggi-do (KR); Industry-Academic Cooperation Foundation, Yonsei University, Seoul (KR)

(72) Inventors: Sungjoon Koh, Daejeon (KR); Myoungsoo Jung, Daejeon (KR)

(73) Assignees: SK hynix Inc., Gyeonggi-do (KR); Industry-Academic Cooperation Foundation, Yonsei University, Seoul (KR)

( * ) Notice: Subject to any disclaimer, the term of this patent is extended or adjusted under 35 U.S.C. 154(b) by 43 days.

(21) Appl. No.: 16/932,996

(22) Filed: Jul. 20, 2020

(65) Prior Publication Data

US 2021/0124503 A1 Apr. 29, 2021

(30) Foreign Application Priority Data

Oct. 25, 2019 (KR) .................... 10-2019-0134130

(51) Int. Cl.
*G06F 3/06* (2006.01)
*G06F 11/16* (2006.01)
*G06F 11/10* (2006.01)

(52) U.S. Cl.
CPC ............ *G06F 3/0619* (2013.01); *G06F 3/064* (2013.01); *G06F 3/0652* (2013.01);
(Continued)

(58) Field of Classification Search
USPC ...................................................... 714/764
See application file for complete search history.

(56) References Cited

U.S. PATENT DOCUMENTS 6,115,280 A * 9/2000 Wada ................... G11C 7/1018
365/189.02
10,680,656 B2 * 6/2020 Song ................. H03M 13/2906
(Continued)

FOREIGN PATENT DOCUMENTS

KR 10-0852193 8/2008
KR 10-2017-0111193 10/2017

OTHER PUBLICATIONS

Cade Metz, Google remakes online empire with 'colossus', Wired, Jul. 10, 2012, Condé Nast, Online.
(Continued)

*Primary Examiner* — Fritz Alphonse
(74) *Attorney, Agent, or Firm* — IP & T Group LLP

(57) ABSTRACT

Provided herein is a storage node of a distributed storage system and a method of operating the same. A memory controller may include a data controller configured to receive a write request and write data corresponding to the write request from a host, and configured to determine a physical address of a memory block in which the write data is to be stored based on chunk type information included in the write request, a memory control component configured to provide a program command for instructing the memory block to store the write data, the physical address, and the write data to the memory device, wherein the chunk type information is information about whether the write data indicates a type of data chunks or a type of coding chunks, the data chunks and the coding chunks being generated by the host performing an erasure coding operation on original data.

20 Claims, 11 Drawing Sheets

(52) U.S. Cl.
CPC .......... *G06F 3/0653* (2013.01); *G06F 3/0659* (2013.01); *G06F 3/0673* (2013.01); *G06F 11/1044* (2013.01); *G06F 11/167* (2013.01)

(56) References Cited

U.S. PATENT DOCUMENTS

| | | | | |
|---|---|---|---|---|
| 2019/0114223 | A1* | 4/2019 | Pydipaty | G06F 3/0688 |
| 2020/0117534 | A1* | 4/2020 | Yurzola | G06F 3/0683 |
| 2021/0141532 | A1* | 5/2021 | Byun | G06F 3/0659 |

OTHER PUBLICATIONS

Sathiamoorthy et al., XORing Elephants Novel Erasure Codes for Big Data, Proceedings of the VLDB Endowment, Jan. 16, 2013, pp. 325-336, vol. 6, Issue 5, VLDB Endowment Inc., USA.

Paul Alcorn, Facebook Asks For QLC NAND, Toshiba Answers with 100TB QLC SSDs With TSV, Tom's Hardware, Aug. 26, 2016, Online.

Micron Technology Inc., Error Correction Code (ECC) in Micron® Single-Level Cell (SLC) NAND, TN-29-63 Error Correction Code (ECC) in SLC NAND Conclusion, 2011, pp. 1-12, Micron Technology, Inc., USA.

Anton Shilov, Toshiba's 768Gb 3D QLC NAND Flash Memory: Matching TLC at 1000 P/E Cycles?, AnandTech, Jul. 3, 2017, Online.

Koh et al., Understanding System Characteristics of Online Erasure Coding on Scalable, Distributed and Large-Scale SSD Array Systems, 2017 IEEE International Symposium on Workload Characterization, Dec. 2017, pp. 76-86, IEEE, USA.

Kshemkalyani et al., Distributed Computing Principles, Algorithms, and Systems, Jan. 29, 2007, pp. 1-728, Cambridge University Press, UK.

Tom Coughlin, Recent Progress And Collaborations In Digital Storage, Forbes, Oct. 7, 2016, Online.

Du et al., LaLDPC Latency-aware LDPC for Read Performance Improvement of Solid State Drives, 33rd International Conference on Massive Storage Systems and Technology, May 2017, pp. 1-11, IEEE, USA.

Zhao et al., LDPC-in-SSD Making Advanced Error Correction Codes Work Effectively in Solid State Drives, Proceedings of the 11th USENIX conference on File and Storage Technologies, Feb. 2013, pp. 243-256, vol. 13, USENIX Association, USA.

Li et al., Reliability Analysis of Deduplicated and Erasure-Coded Storage, ACM SIGMETRICS Performance Evaluation Review, Jan. 2011, pp. 4-9, vol. 38, Issue 3, ACM, USA.

Xia et al., Efficient Data Integrity Verification Using CRC Based on HDFS in Cloud Storage, ITM Web of Conferences, Jan. 2017, pp. 1-8, vol. 11, EDP Sciences, France.

\* cited by examiner

STORAGE NODE OF DISTRIBUTED STORAGE SYSTEM AND METHOD OF OPERATING THE SAME

CROSS-REFERENCE TO RELATED APPLICATION

The present application claims priority under 35 U.S.C. § 119(a) to Korean patent application number 10-2019-0134130, filed on Oct. 25, 2019, which is incorporated herein by reference in its entirety.

BACKGROUND

Field of Invention

Various embodiments of the present disclosure generally relate to an electronic device, and more particularly, to a storage node of a distributed storage system and a method of operating the storage node.

Description of Related Art

With the development of technology, a so-called "data explosion" has occurred, indicating a rapid increase in the amount of data to be stored. Due thereto, a parallel file system and a distributed storage system, which are capable of storing a large amount of data are widely applied to a data center and high-performance computing, and the ratio of large-capacity storage systems to all storage systems has gradually increased indicating the importance of large-capacity storage systems.

A distributed storage system is a scheme for replicating and storing the same data in order to recover data using a correction method in response to unexpected storage faults and failures, thus guaranteeing the reliability of data. Examples of a distributed storage system are Panasas, Parallel Virtual File System (PVFS), IBM General Parallel File System (GPFS), Lustre, Ceph, etc.

A storage device may be a storage node of the distributed storage system. The storage device may include memory devices in which data is stored and a memory controller which controls the memory device. Memory devices are classified into a volatile memory device and a nonvolatile memory device.

SUMMARY

Various embodiments of the present disclosure are directed to a storage node of a distributed storage system and a method of operating the storage node, which may more efficiently manage data.

An embodiment of the present disclosure may provide for a memory controller for controlling an operation of a memory device. The memory controller may include a data controller configured to receive a write request requesting the memory device to store write data from a host, and determine a physical address of a memory block in which the write data is to be stored based on chunk type information included in the write request, and a memory control component configured to provide a program command for instructing the memory block to store the write data at the physical address in the memory device, wherein the chunk type information indicates a type of the write data which is one of a data chunk or a coding chunk, the data chunk and the coding chunk being generated by the host performing an erasure coding operation on original data.

An embodiment of the present disclosure may provide for a memory controller for controlling an operation of a memory device. The memory controller may include a data controller configured to receive a write request requesting the memory device to store write data from a host, an error correction circuit configured to perform an error correction encoding operation on the write data based on chunk type information included in the write request, and a memory control component configured to provide the memory device with a program command for instructing which is the encoded write data, to be stored in the memory device, wherein the chunk type information indicates a type of the write data, which is one of a data chunk and a coding chunk, the data chunk and the coding chunks being generated by the host performing an erasure coding operation on original data.

An embodiment of the present disclosure may provide for a method of operating a memory controller, the memory controller receiving write data and a write request from a host and controlling an operation of a memory device. The method may include determining, based on chunk type information included in the write request, whether the write data is a data chunk or a coding chunk, performing one of first error correction and second error correction on the write data depending on whether the write data is the data chunk or the coding chunk, and controlling the memory device so that the write data is stored in one of a first memory block and a second memory block included in the memory device depending on whether the write data is the data chunk or the coding chunk.

An embodiment of the present disclosure may provide for operating method comprising controlling a memory device to: store data and coding chunks in first and second storage units, respectively, in response to a write request including indication of accompanying write data as one of the data and coding chunks, the first storage unit having a greater storage density than the second storage unit, select, as a victim storage unit for a garbage collection operation, the second storage unit prior to the first storage unit, and select, as a target storage unit for a read reclaim operation, the first storage unit prior to the second storage unit, wherein the data and coding chunks are a result of an erasure encoding on original data.

DETAILED DESCRIPTION

Specific structural or functional descriptions in the embodiments of the present disclosure introduced in this specification or application are only for description of the embodiments of the present disclosure. The descriptions should not be construed as being limited to the embodiments described in the specification or application.

Hereinafter, the present disclosure will be described in detail based on various embodiments of the present disclosure with reference to the accompanying drawings. Below, embodiments of the present disclosure will be described in detail with reference to the attached drawings.

Figure 1:
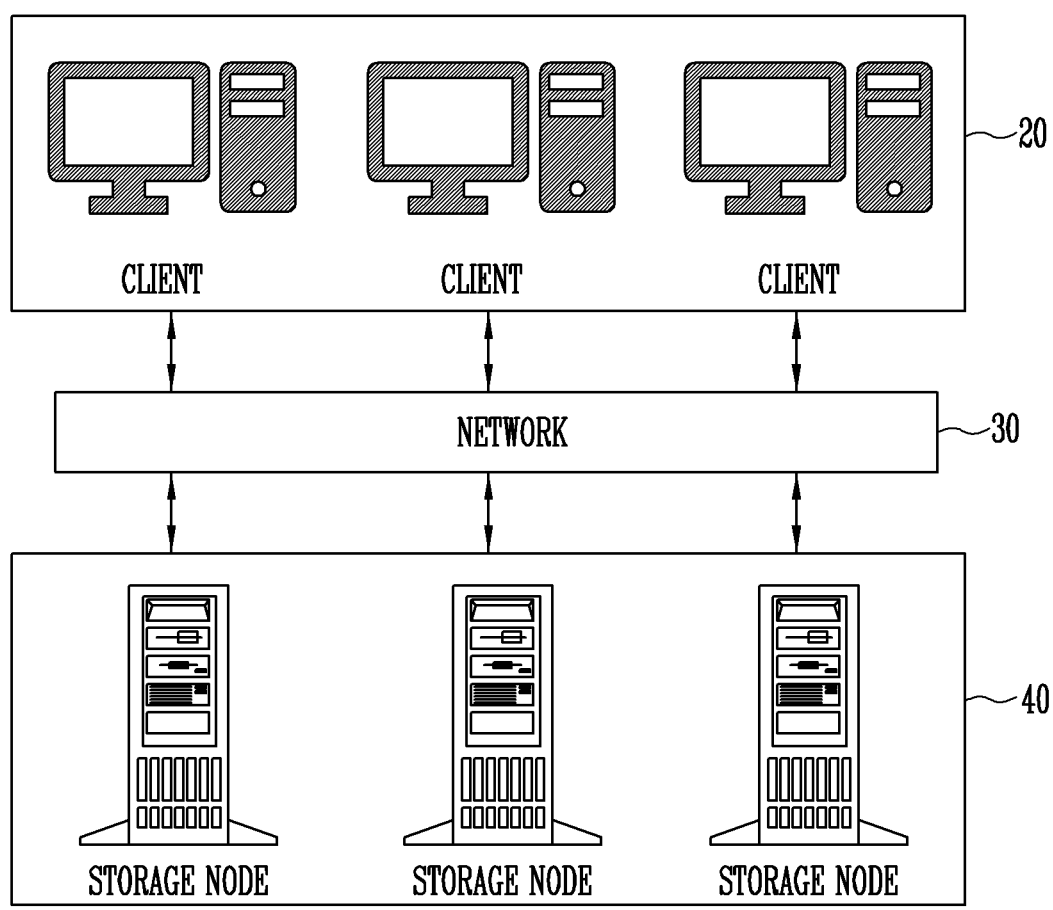
FIG. 1 is a diagram illustrating a configuration of a distributed storage system.

FIG. 1 is a diagram illustrating a configuration of a distributed storage system.

Referring to FIG. 1, the distributed storage system according to an embodiment of the present disclosure may include a client group 20, a network 30, and a storage group 40. The client group 20 may include a plurality of clients. In an embodiment, each client may be an electronic device having a communication function. For example, the client may include at least one of a smartphone, a tablet personal computer (PC), a mobile phone, a video phone, an e-book reader, a desktop PC, a laptop PC, a netbook computer, a personal digital assistant (PDA), a portable multimedia player (PMP), an MP3 player, a mobile medical appliance, a camera, and a wearable device (e.g., a head-mounted-device (HMD) such as electronic glasses, electronic clothing, an electronic bracelet, an electronic necklace, an electronic appcessory (i.e., application accessory), an electronic tattoo, or a smart watch).

The client may provide original data, which is data to be stored in the storage group 40, over the network 30. The client group 20 may provide file operation processing through a file-system interface, and the storage group 40 may store and manage the original data received from the client group 20. The network 30 may support communication protocols that enable the sending/reception of messages, such as Ethernet or InfiniBand.

The storage group 40 may include a plurality of storage nodes. Each storage node may include a host which processes data received over the network 30 and a storage device which stores data processed by the host. Each storage node may receive the original data provided by the corresponding client over the network 30. In an embodiment, the network 30 may mutually transfer data exchanged between the client group 20 and the storage group 40 over a wireless or wired communication network.

The host included in the storage node may perform erasure coding to secure the reliability of the received original data. Also, the host may add a Cyclic Redundancy Check (CRC) code to the data on which erasure coding has been performed. The host may control the corresponding storage device so that the data in which the CRC code is added to the data on which erasure coding has been performed, is stored in the storage device.

When erasure coding has been performed, data chunks and coding chunks may be generated from the original data. The data chunks may be data generated by dividing the received original data into a plurality of chunks to store and manage the original data in a distributed manner.

The coding chunks may be data including either logical addresses for identifying the data chunks or information used to decode the data chunks into the original data.

When erasure coding is performed in the storage node of the distributed storage system, frequent context switching, frequent I/O operation, and high network traffic, together with the high use rate of a Central Processing Unit (CPU), may occur. In order to solve this problem, the storage node according to an embodiment of the present disclosure may perform control such that encoding and decoding using different error correction codes are performed on data chunks and coding chunks generated through erasure coding such that the data chunks and the coding chunks are stored in different memory blocks. Hereinafter, the storage group 40 according to an embodiment of the present disclosure will be described in detail with reference to FIG. 2.

Figure 2:
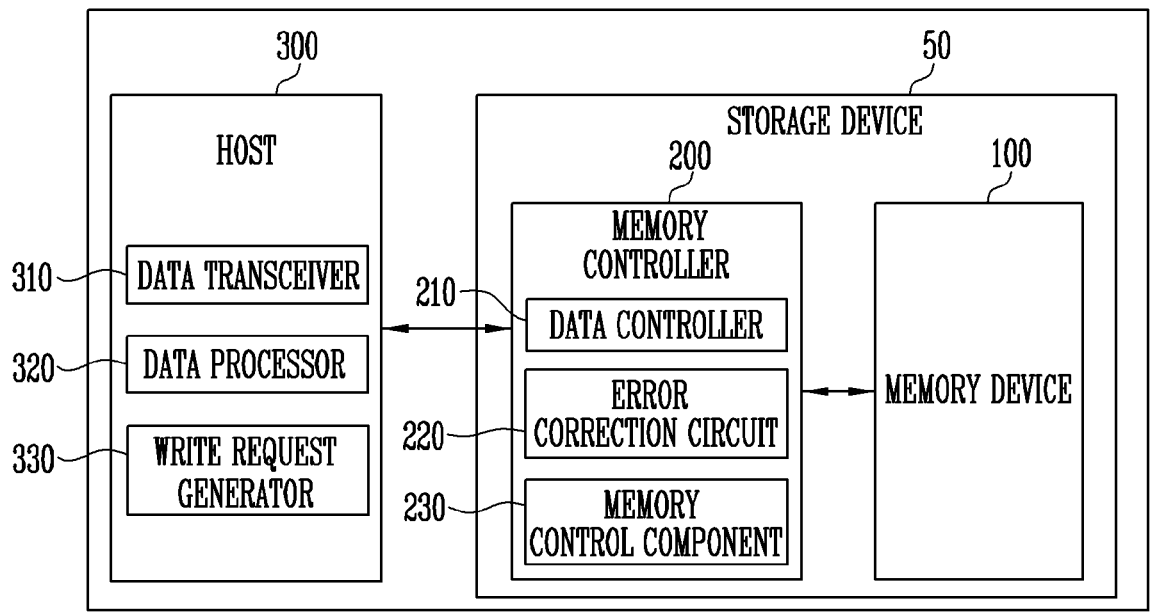
FIG. 2 is a diagram illustrating a storage node, such as that of FIG. 1.

FIG. 2 is a diagram illustrating a storage node, such as that of FIG. 1.

Referring to FIG. 2, the storage node 400 may include a host 300 and a storage device 50.

The host 300 may receive data over a network. The host 300 may control the storage device 50 so that the received data is stored in the storage device 50. The host 300 may communicate with the storage device 50 using at least one of various communication methods such as Universal Serial Bus (USB), Serial AT Attachment (SATA), Serial Attached SCSI (SAS), High Speed Interchip (HSIC), Small Computer System Interface (SCSI), Peripheral Component Interconnection (PCI), PCI express (PCIe), Nonvolatile Memory express (NVMe), Universal Flash Storage (UFS), Secure Digital (SD), MultiMedia Card (MMC), embedded MMC (eMMC), Dual In-line Memory Module (DIMM), Registered DIMM (RDIMM), and Load Reduced DIMM (LRDIMM) communication methods.

In an embodiment, the host 300 may include a data transceiver 310, a data processor 320, and a write request generator 330.

The data transceiver 310 may receive original data from a client, described with reference to FIG. 1, over a network. The data transceiver 310 may provide the received original data to the data processor 320. The data transceiver 310 may acquire the data stored in the storage device 50, and may provide the acquired data to the client over the network.

The data processor 320 may receive the original data from the data transceiver 310, and may perform erasure coding on the original data. In an embodiment, erasure coding may be coding that is performed using a Reed-Solomon (RS) code. Erasure coding may be a coding scheme by which the size of data on which encoding has been performed becomes smaller than that of the original data. The data processor 320 may generate a plurality of data chunks and a plurality of coding chunks by performing erasure coding on the original data.

The plurality of coding chunks may be updated whenever any one of the data chunks is updated. The plurality of coding chunks may be read when a read operation on any one of the data chunks fails. The reason for this is that the coding chunks are pieces of data used to recover a failed data chunk.

In an embodiment, the data processor 320 may further perform an operation of adding a CRC code to the data chunks and the coding chunks that are the results of performing erasure coding. The CRC code may be an error detection method for verifying the reliability of data in a serial transmission scheme. When data to which the CRC code is added is provided to the storage device 50, the storage device 50 may receive the CRC code-added data, and may then perform CRC decoding on the received data.

The write request generator 330 may receive write data from the data processor 320, and may then generate a write request. The write request generator 330 may provide the write request and the write data to the storage device 50.

The write data may indicate the data chunks and the coding chunks that are the results of erasure coding performed by the data processor 320. Alternatively, in an embodiment, the write data may be data in which a CRC code is added to the data chunks and the coding chunks. The write request generator 330 may provide the storage device 50 with chunk type information indicating a type of write data to be stored in the storage device 50 which is a data chunk or a coding chunk. For example, the write request generator 330 may generate a write request including chunk type information indicating whether the write data corresponding to the write request is a data chunk or a coding chunk. The write request generator 330 may provide the generated write request and the write data to the storage device 50.

The storage device 50 may include a memory device 100 and a memory controller 200. The storage device 50 may be a device which stores data under the control of the host 300. The storage device 50 may be manufactured as any one of various types of data storage devices depending on a host interface which is a scheme for communication with the host 300. For example, the storage device 50 may be implemented as any one of various types of storage devices, for example, a solid state disk (SSD), a multimedia card such as an MMC, an embedded MMC (eMMC), a reduced size MMC (RS-MMC), or a micro-MMC, a secure digital card such as an SD, a mini-SD, or a micro-SD, a universal storage bus (USB) storage device, a universal flash storage (UFS) device, a personal computer memory card international association (PCMCIA) card-type storage device, a peripheral component interconnection (PCI)-card type storage device, a PCI express (PCI-E) card-type storage device, a compact flash (CF) card, a smart media card, and a memory stick.

The storage device 50 may be manufactured in any one of various types of package forms. For example, the storage device 50 may be manufactured in any one of various types of package forms, such as package on package (POP), system in package (SIP), system on chip (SOC), multi-chip package (MCP), chip on board (COB), wafer-level fabricated package (WFP), and wafer-level stack package (WSP).

The memory device 100 may store data. The memory device 100 may be operated in response to the control of the memory controller 200. The memory device 100 may include a memory cell array including a plurality of memory cells which store data.

Each memory cell may be operated as any one of a single-level cell (SLC) capable of storing one data bit or a multi-level cell (MLC) capable of storing two or more data bits. For example, the multi-level cell may refer to a MLC capable of storing two data bits, a triple-level cell (TLC) capable of storing three data bits, a quad-level cell (QLC) capable of storing four data bits, and a memory cell capable of storing five or more data bits.

The memory cell array may include a plurality of memory blocks. Each memory block may include a plurality of memory cells. A memory block may be a unit by which data stored in the memory device 100 is erased. In an embodiment, each memory block may include a plurality of pages. Each page may be a unit by which data is stored in the memory device 100 or by which data stored in the memory device 100 is read.

In an embodiment, the memory device 100 may take many alternative forms, such as a double data rate synchronous dynamic random access memory (DDR SDRAM), a low power double data rate fourth generation (LPDDR4) SDRAM, a graphics double data rate (GDDR) SDRAM, a low power DDR (LPDDR) SDRAM, a Rambus dynamic random access memory (RDRAM), a NAND flash memory, a vertical NAND flash memory, a NOR flash memory device, a resistive RAM (RRAM), a phase-change RAM (PRAM), a magnetoresistive RAM (MRAM), a ferroelectric RAM (FRAM), or a spin transfer torque RAM (STT-RAM). In the present specification, for convenience of description, a description will be made on the memory device 100 being a NAND flash memory.

The memory device 100 may receive a command and an address from the memory controller 200, and may access the area of the memory cell array, selected by the address. That is, the memory device 100 may perform an operation corresponding to the received command on the area selected by the address. For example, the memory device 100 may perform a program operation, a read operation, and an erase operation. The program operation may be an operation of storing data in memory cells included in the memory device 100. The memory device 100 may perform a program operation of storing data in the area selected by the address in response to a program command received from the memory controller 200. The read operation may be an operation of sensing the data stored in the memory cells using a read voltage. The memory device 100 may sense the data stored in the area selected by the address in response to a read command received from the memory controller 200. An erase operation may be an operation of deleting the data stored in the memory cells. The memory device 100 may erase the data stored in the area selected by the address in response to an erase command received from the memory controller 200. In an embodiment, erasing the data stored in the memory cells may be an operation of decreasing the threshold voltages of memory cells so that the threshold voltages of the memory cells belong to a threshold voltage distribution corresponding to an erased state.

The memory controller 200 may control the overall operation of the memory device 100.

When power is applied to the storage device 50, the memory controller 200 may run previously stored firmware (FW). When the memory device 100 is a flash memory device, the memory controller 200 may run firmware such as a Flash Translation Layer (FTL) for controlling communication between the host 300 and the memory device 100.

In an embodiment, the memory controller 200 may include a data controller 210, an error correction circuit 220, and a memory control component 230.

The data controller 210 may receive write data and a write request from the host 300. The write request received from the host 300 may include data identification information that is information indicating whether the write data corresponding to the write request is a data chunk or a coding chunk.

For example, the write request may include a logical address (LA) for identifying the write data and chunk type information of the write data. When the write request is input, the data controller 210 may receive the write data to be stored from the host 300. The data controller 210 may generate map data in which the input logical address is mapped to a physical address (PA) indicating the physical address of the memory cells in which the write data is to be stored, among the memory cells included in the memory device 100. Here, the data controller 210 may determine, based on the chunk type information, a physical address at which the write data is to be stored.

That is, the data controller 210 may map the logical address of the write data to a physical address so that the write data input from the host is stored in different memory blocks depending on whether the write data corresponds to a coding chunk or a data chunk.

The data controller 210 may map a logical address to a physical address so that a data chunk is stored in a memory block programmed using an MLC (i.e., capable of storing two or more bits) scheme, and may map a logical address to a physical address so that a coding chunk is stored in a memory block programmed using an SLC scheme. In an embodiment, the number of data bits stored in a memory cell included in the memory block which stores coding chunks may be less than the number of data bits stored in a memory cell included in the memory block which stores data chunks.

The number of read requests made for a data chunk may be greater than the number of read requests made for a coding chunk. In contrast, the number of updates performed on a coding chunk may be greater than the number of updates performed on a data chunk. Therefore, there is an advantage in that, when a data chunk and a coding chunk are stored in different memory blocks, as described above, the number of read reclaim operations to be performed on the memory block in which the coding chunk is stored may be minimized.

Further, when a read operation is requested for a data chunk while a read reclaim operation or a garbage collection operation is performed on the memory block in which the data chunk is stored, the storage device may perform the read request from the client, described above with reference to FIG. 1, by reading coding chunks and providing the read coding chunks to the host, rather than performing the operation of reading the corresponding data chunk. This is due to the characteristics of an erasure coding scheme (e.g., Reed-Solomon code) that enables original data to be recovered as long as a preset number of chunks are present, regardless of the type of chunks.

The error correction circuit 220 may perform an encoding operation using an error correction code on data to be stored in the memory device 100. The error correction circuit 220 may perform a decoding operation using the error correction code to correct error bits contained in data read (acquired) from the memory device 100. The error correction circuit 220 may perform an error correction decoding operation using a low density parity check (LDPC) code, a Bose, Chaudhri, Hocquenghem (BCH) Code, a turbo code, a Reed-Solomon code, a convolution code, a recursive systematic code (RSC), or coded modulation such as trellis-coded modulation (TCM), block coded modulation (BCM), or hamming code.

In accordance with an embodiment of the present disclosure, the error correction circuit 220 may perform an error correction encoding operation using different types of error correction codes on data chunks and coding chunks. For example, the error correction circuit 220 may encode coding chunks using an error correction code having a relatively large capability of error correction. The error correction circuit 220 may encode data chunks using an error correction code having a relatively small capability of error correction. For example, the error correction circuit 220 may encode data chunks using a BCH code, and may encode coding chunks using an LDPC code.

The number of read requests made for coding chunks may be less than the number of read requests made for data chunks. Therefore, the degree of charge leakage from a memory cell in which a coding chunk is stored may be greater than that from a memory cell in which a data chunk is stored. Therefore, higher reliability for coding chunks should be guaranteed. In accordance with an embodiment of the present disclosure, the reliability of coding chunks may be guaranteed by applying an error correction code having relatively high error correction capability to the coding chunks.

In various embodiments, the error correction circuit 220 may perform different error correction on data chunks and coding chunks. For example, the error correction circuit 220 may perform error correction only on coding chunks without performing error correction on data chunks.

The memory control component 230 may provide program data, a physical address, and a program command to the memory device 100. The program command provided by the memory control component 230 may be a command for instructing the memory device to perform a program operation in response to the write request received from the host. The program data may be data for which error correction encoding has been completed by the error correction circuit 220.

Figure 3:
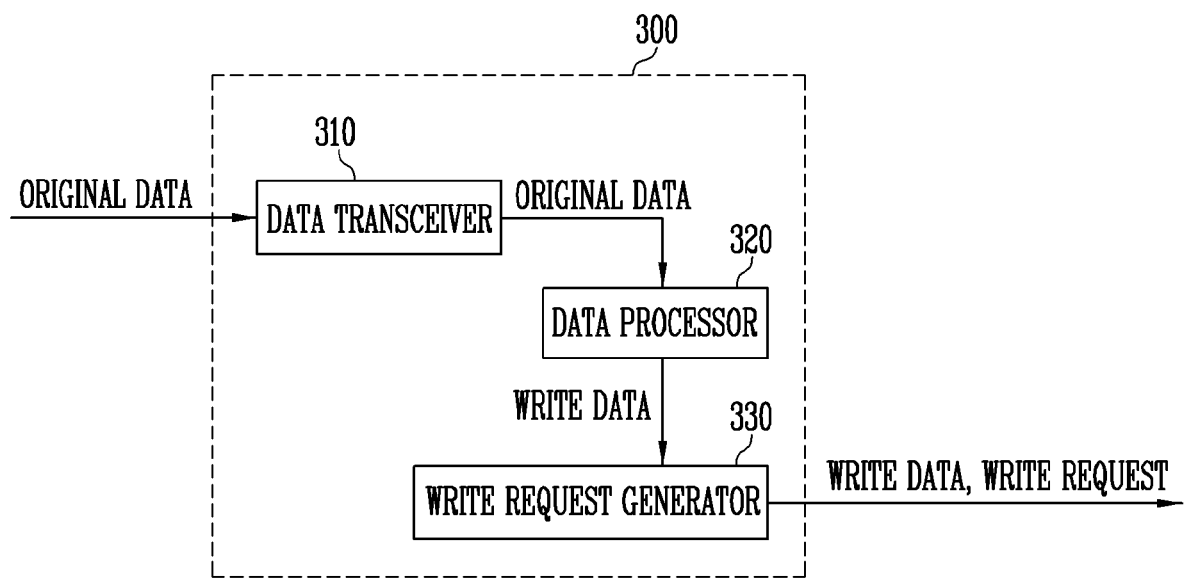
FIG. 3 is a diagram illustrating an operation of a host included in a storage node according to an embodiment of the present disclosure.

FIG. 3 is a diagram illustrating an operation of a host included in a storage node according to an embodiment of the present disclosure.

Referring to FIG. 3, the host 300 may include a data transceiver 310, a data processor 320, and a write request generator 330.

The data transceiver 310 may receive original data from a client over a network, as described with reference to FIG. 1. Thereafter, the data transceiver 310 may provide the received original data to the data processor 320.

The data processor 320 may receive the original data from the data transceiver 310, and may perform erasure coding on the original data. Data in which erasure coding has been performed on the original data may be write data. The data processor 320 may provide the write data to the write request generator 330. The write data may be data in which a CRC code is added to data chunks and coding chunks generated by performing erasure coding on the original data. In an embodiment, the addition of a CRC code may be omitted. Erasure coding may be an operation of dividing the original data into a plurality of chunks having a capacity smaller than that of the original data.

The write request generator 330 may receive write data from the data processor 320, generate a write request, and output the write data and the write request to the memory controller 200. When generating the write request, the write request generator 330 may also generate chunk type information for the write data in one or more bits included in the write request. That is, the write request may include a logical address (LA) for identifying the corresponding write data and the chunk type information for the write data. The chunk type information may correspond to information indicating whether the write data generated through erasure coding is a data chunk or a coding chunk.

Figure 4:
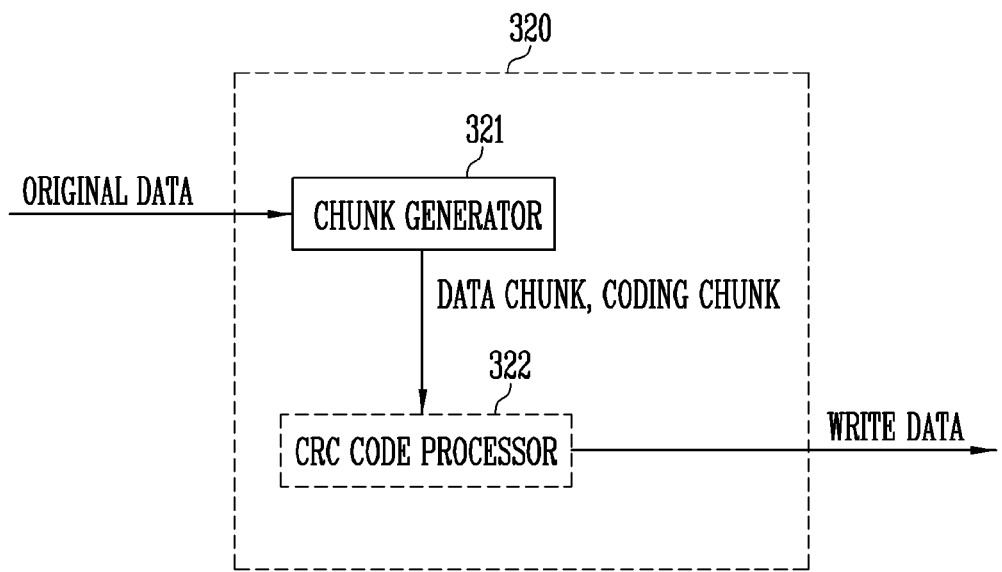
FIG. 4 is a diagram illustrating an operation of a data processor, such as that of FIG. 3.

FIG. 4 is a diagram illustrating an operation of a data processor, such as that of FIG. 3.

Referring to FIG. 4, the data processor 320 may include a chunk generator 321 and a CRC code processor 322.

The chunk generator 321 may receive original data from a data transceiver 310, and may perform erasure coding on the original data. For example, the chunk generator 321 may encode the original data using a Reed-Solomon (RS) code. When erasure coding has been performed, a plurality of data chunks and a plurality of coding chunks may be generated. In various embodiments, the chunk generator 321 may divide the original data into six data chunks and three coding chunks, or into ten data chunks and four coding chunks. In the present specification, an example in which erasure coding is performed such that the original data is divided into six data chunks and three coding chunks is described. The generated data chunks and coding chunks may be output to the CRC code processor 322.

The CRC code processor 322 may receive the data chunks and the coding chunks from the chunk generator 321, and may then perform an encoding operation using a CRC code. The CRC code may correspond to an error detection method for verifying the reliability of data in a serial transmission scheme. In an embodiment, the encoding operation using a CRC code may be omitted.

Figure 5:
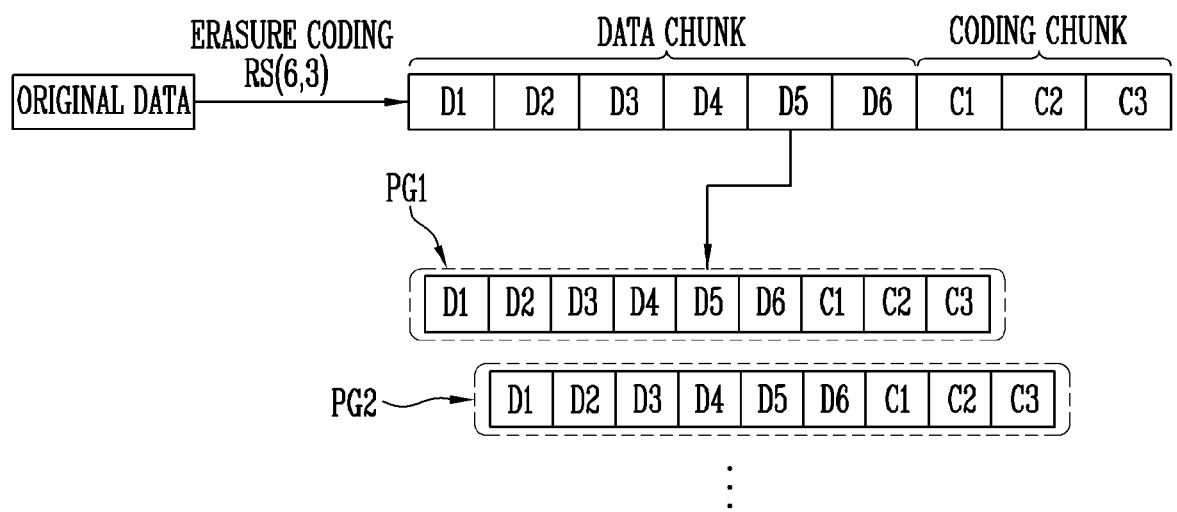
FIG. 5 is a diagram illustrating an erasure coding operation of a data processor of FIG. 4.

FIG. 5 is a diagram illustrating an erasure coding operation of the data processor of FIG. 4.

Referring to FIG. 5, the data processor 320 may divide original data into a plurality of data chunks D1 to D6 and a plurality of coding chunks C1 to C3 by performing erasure coding. Erasure coding may include various types, such as an RS code which is one type of erasure coding, and may also include various types depending on the number of data chunks and coding chunks resulting from the division. In an embodiment of FIG. 5, the results of erasure coding performed using an RS (6, 3) Reed-Solomon code which divides the original data into six data chunks and three coding chunks are illustrated. When any one of the data chunks is to be updated, encoding using an RS code is re-performed, and thus all of the coding chunks may be updated.

Figure 6:
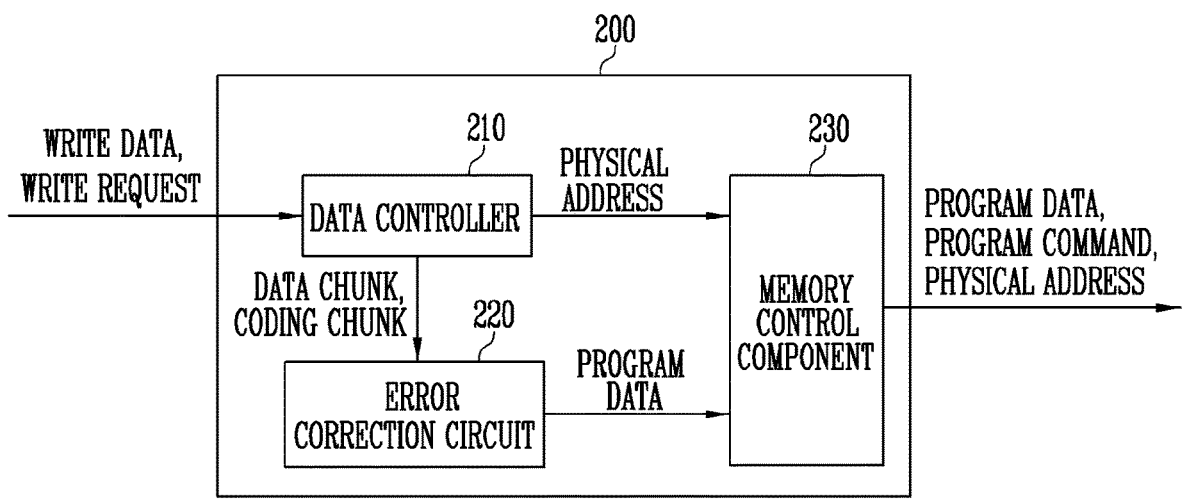
FIG. 6 is a diagram illustrating a configuration of a memory controller according to an embodiment of the present disclosure.

FIG. 6 is a diagram illustrating a configuration of a memory controller according to an embodiment of the present disclosure.

Referring to FIG. 6, the memory controller 200 may include a data controller 210, an error correction circuit 220, and a memory control component 230.

The data controller 210 may receive write data and a write request from the host 300, and may control error correction for the corresponding write data based on chunk type information assigned to one or more bits of the write request. As described above, since the number of read requests made for a coding chunk is less than that made for a data chunk, the possibility of occurrence of retention in the coding chunk, in which electrons gradually escape from the coding chunk due to tunneling and data is lost with the lapse of time, may be stronger than that in the data chunk. Therefore, there is a need to perform error correction, requiring higher reliability than that of data chunks, on coding chunks. Therefore, when providing the write data to the error correction circuit 220, the data controller 210 may output data chunks and coding chunks to respective areas on which different error correction operations are to be performed by the error correction circuit 220. Since error correction for the coding chunks may need higher reliability than that for the data chunks, an error correction code that enables a larger number of error bits to be corrected may be used.

The data controller 210 may receive the write data and the write request from the host 300, and may control the storage of data so that the corresponding write data is stored in different memory blocks based on the chunk type information assigned to one or more bits of the write request. For example, the data controller 210 may output physical addresses corresponding to different memory blocks based on the chunk type information.

From the standpoint of data update, coding chunks may be updated when at least one of the data chunks indicating the same original data is updated with new data. That is, the coding chunks may be more frequently updated than the data chunks. Accordingly, a previous coding chunk may be an invalid coding chunk, and a new coding chunk may be a valid coding chunk. Therefore, when a memory block which stores a coding chunk is assigned as a block different from a memory block which stores a data chunk, the memory block which stores the coding chunk is preferentially selected as a victim block when a garbage collection operation is performed, and thus a delay time required to search for a victim block may be reduced.

From the standpoint of a read operation, a data chunk may be more frequently read than a coding chunk. Accordingly, the average number of read operations performed on a memory block which stores a data chunk may be greater than that performed on a memory block which stores a coding chunk. A read reclaim operation which reads data stored in a single memory block, corrects error in the read data through the memory controller, and writes the error-corrected data to another memory block may be performed on a memory block on which the average number of read operations is larger. Therefore, a read reclaim operation may be performed on the memory block which stores a data chunk, prior to the memory block which stores a coding chunk. During the read reclaim operation, the read reclaim operation is preferentially performed on the memory block which stores a data chunk, and thus the number of read reclaim operations to be performed on the memory block which stores a coding chunk may be reduced.

Figure 7:
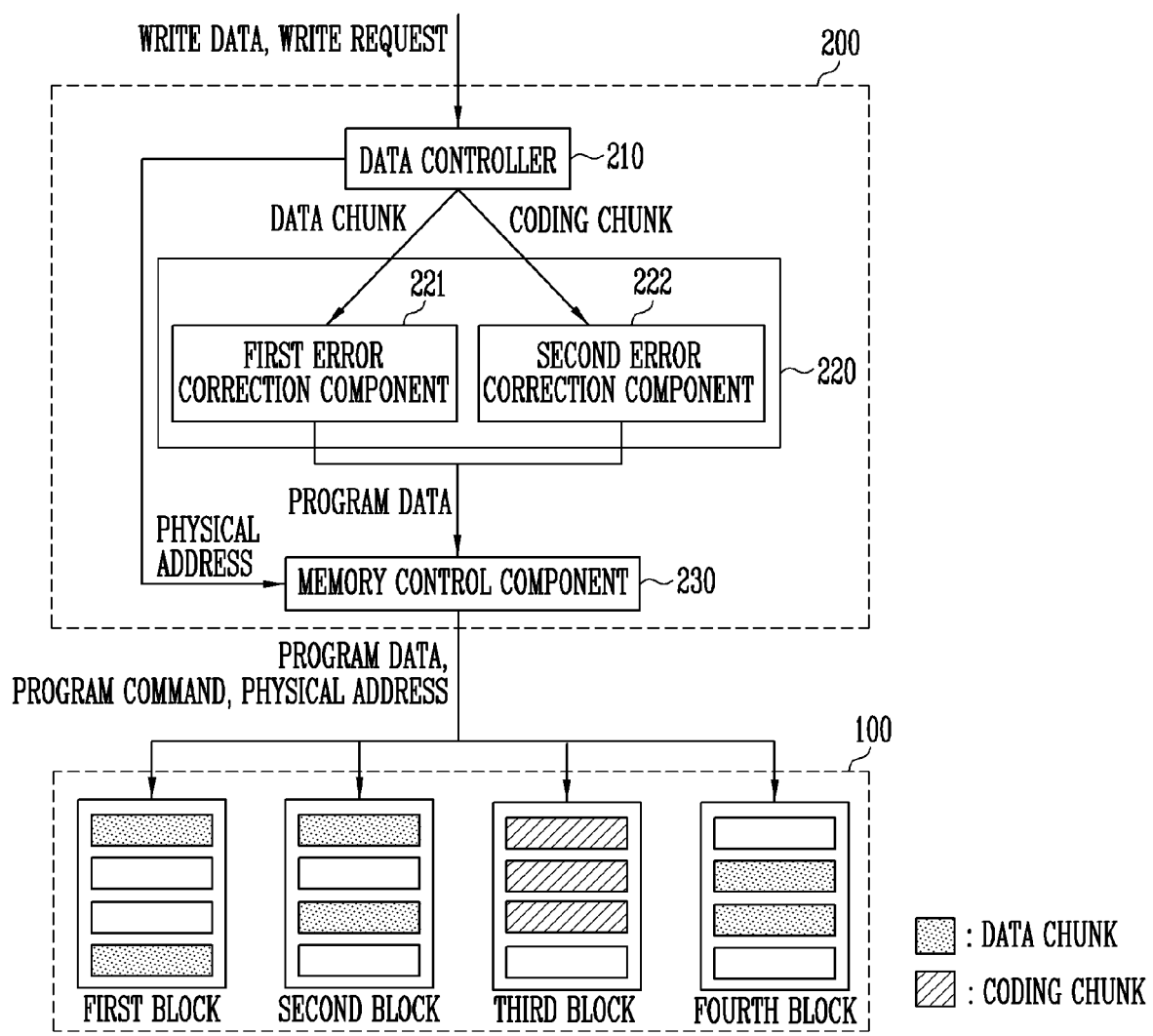
FIG. 7 is a diagram illustrating an operation of a memory controller and a memory device according to an embodiment of the present disclosure.

FIG. 7 is a diagram illustrating an operation of a memory controller and a memory device according to an embodiment of the present disclosure.

Referring to FIG. 7, the data controller 210 may respectively assign data chunks and coding chunks to different error correction components of the error correction circuit 220. As described above, since the possibility of occurrence of retention in coding chunks is stronger than that in data chunks, there is a need to perform error correction having higher reliability. Therefore, the data controller 210 may output the data chunks to the first error correction component 221, and may output the coding chunks to the second error correction component 222. Error correction performed by the second error correction component 222 may be error correction having higher reliability than error correction performed by the first error correction component 221. For example, the first error correction component 221 may perform error correction using a BCH code, and the second error correction component 222 may perform error correction using an LDPC code. Data on which error correction decoding has been performed by the first error correction component 221 and the second error correction component 222 may be provided, as program data, to the memory control component 230.

In an embodiment, the data controller 210 may control the storage of data so that the write data is stored in different memory blocks depending on whether the write data is a data chunk or a coding chunk based on the chunk type information included in the write request. For example, the data controller 210 may output physical addresses corresponding to different memory blocks based on the chunk type information. For example, the memory controller 200 may control the memory device 100 so that data chunks are stored in a first block, a second block, and a fourth block and so that coding chunks are stored in a third block.

Figure 8:
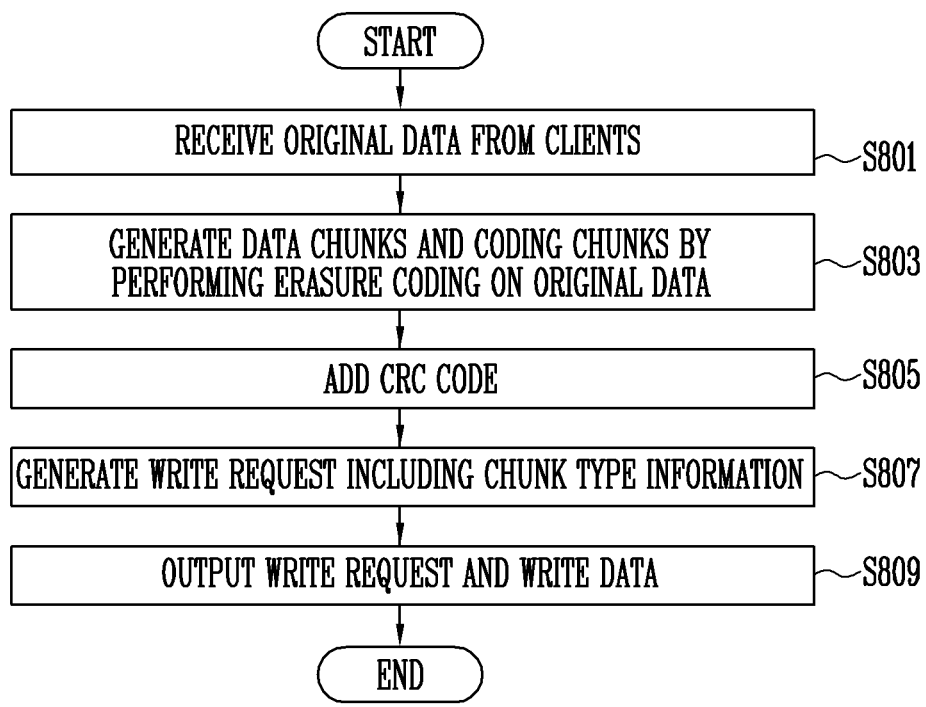
FIG. 8 is a flowchart illustrating an operation of a host in a storage node according to an embodiment of the present disclosure.

FIG. 8 is a flowchart illustrating the operation of a host in a storage node according to an embodiment of the present disclosure.

Referring to FIG. 8, at step S801, the host may receive original data from clients.

At step S803, the host may generate a plurality of data chunks and coding chunks by performing erasure coding on the original data. Erasure coding may be an operation of dividing the original data into a plurality of chunks to secure the reliability of the original data.

At step S805, the host may add a CRC code to the generated data chunks and coding chunks. A Cyclic Redundancy Check (CRC) may correspond to an error detection method for verifying the reliability of data in a serial transmission scheme.

At step S807, the host may generate a write request including chunk type information. For example, the write request may include a logical address and the chunk type information which enable the write data to be identified. The host may assign the chunk type information of the corresponding write data to one or more redundant bits of the write request. The chunk type information may be information indicating whether the write data is a data chunk or a coding chunk.

At step S809, the host may output the write request and the write data to the storage device. The host may request the storage device to perform different operations based on the chunk type by assigning the chunk type information of the corresponding write data to the write request and outputting the write request, together with the write data.

Figure 9:
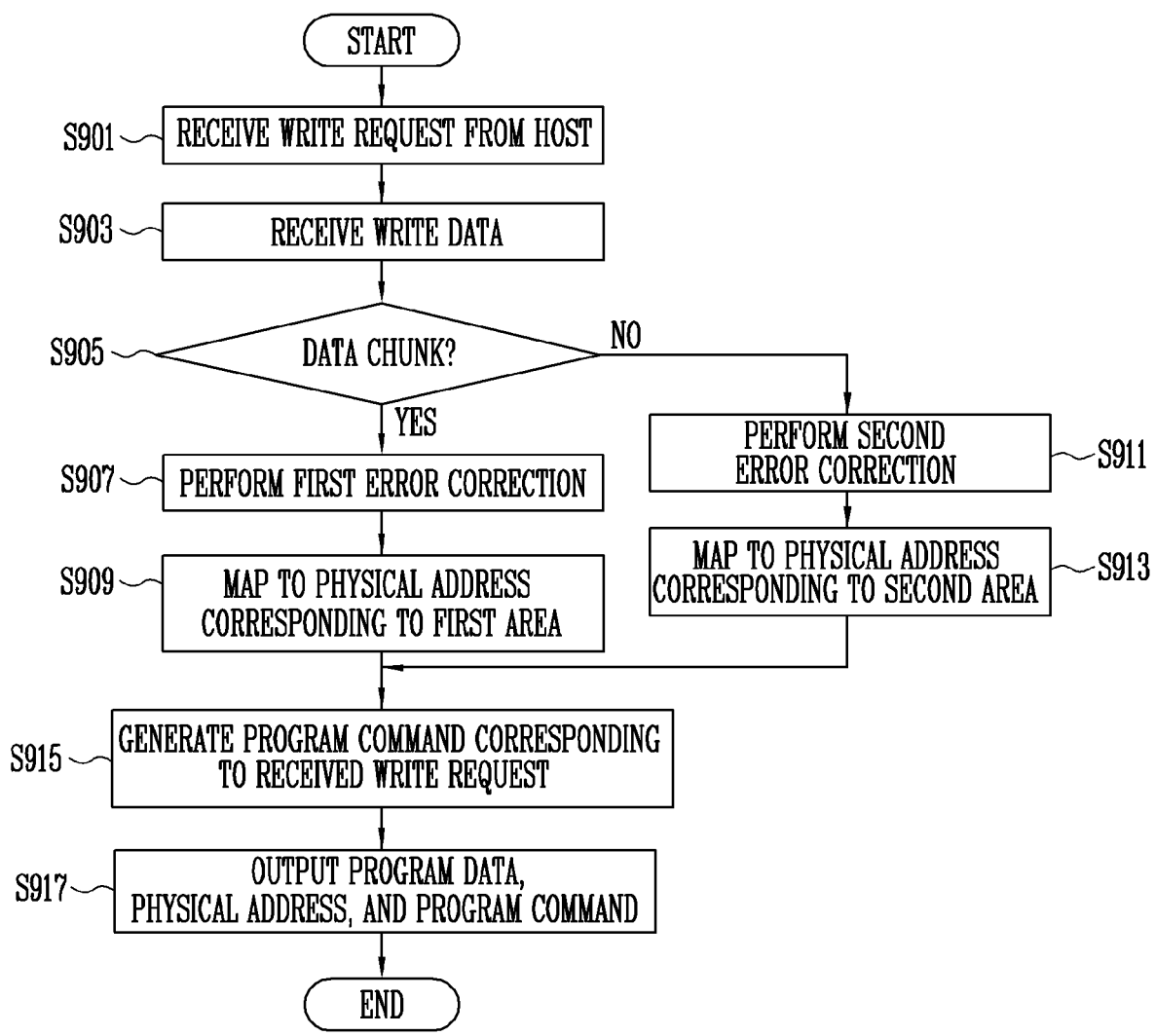
FIG. 9 is a flowchart illustrating an operation of a memory controller according to an embodiment of the present disclosure.

FIG. 9 is a flowchart illustrating the operation of a memory controller according to an embodiment of the present disclosure.

Referring to FIG. 9, at step S901, the memory controller may receive a write request from the host. The write request may include a logical address and chunk type information which enable write data to be identified.

At step S903, the memory controller may receive the write data to be stored from the host. The write data may correspond to data in which erasure coding and CRC have been performed on original data received by the host from clients. In an embodiment, the CRC may be omitted. Therefore, the write data may correspond to any one of a data chunk and a coding chunk.

At step S905, the memory controller may determine whether the received write data is a data chunk or a coding chunk. For example, the memory controller may determine, based on the chunk type information included in one or more redundant bits of the write request, whether the write data is a data chunk or a coding chunk. When the input write data is the data chunk (YES at step S905), the process may proceed to step S907. When the input write data is the coding chunk (NO at step S905), the process may proceed to step S911.

At step S907, the memory controller may perform first error correction on the write data corresponding to the data chunk. At step S911, the memory controller may perform second error correction on the write data corresponding to the coding chunk. For example, the memory controller may perform error correction encoding using a BCH code on the data chunk, and may perform error correction decoding using an LDPC code on the coding chunk.

At step S909, the memory controller may map a logical address for identifying the write data corresponding to the data chunk to a physical address corresponding to a first area of the memory device. At step S913, the memory controller may map a logical address for identifying the write data corresponding to the coding chunk to a physical address corresponding to a second area of the memory device. The first area may indicate memory blocks which store data chunks. The second area may indicate memory blocks which store coding chunks.

At step S915, the memory controller may generate a program command corresponding to the write request received from the host. The program command may be a command which controls the memory device so that the memory device performs a program operation of storing the input data in an area selected by the input physical address.

At step S917, the memory controller may output the program data, the physical address, and the program command to the memory device.

Figure 10:
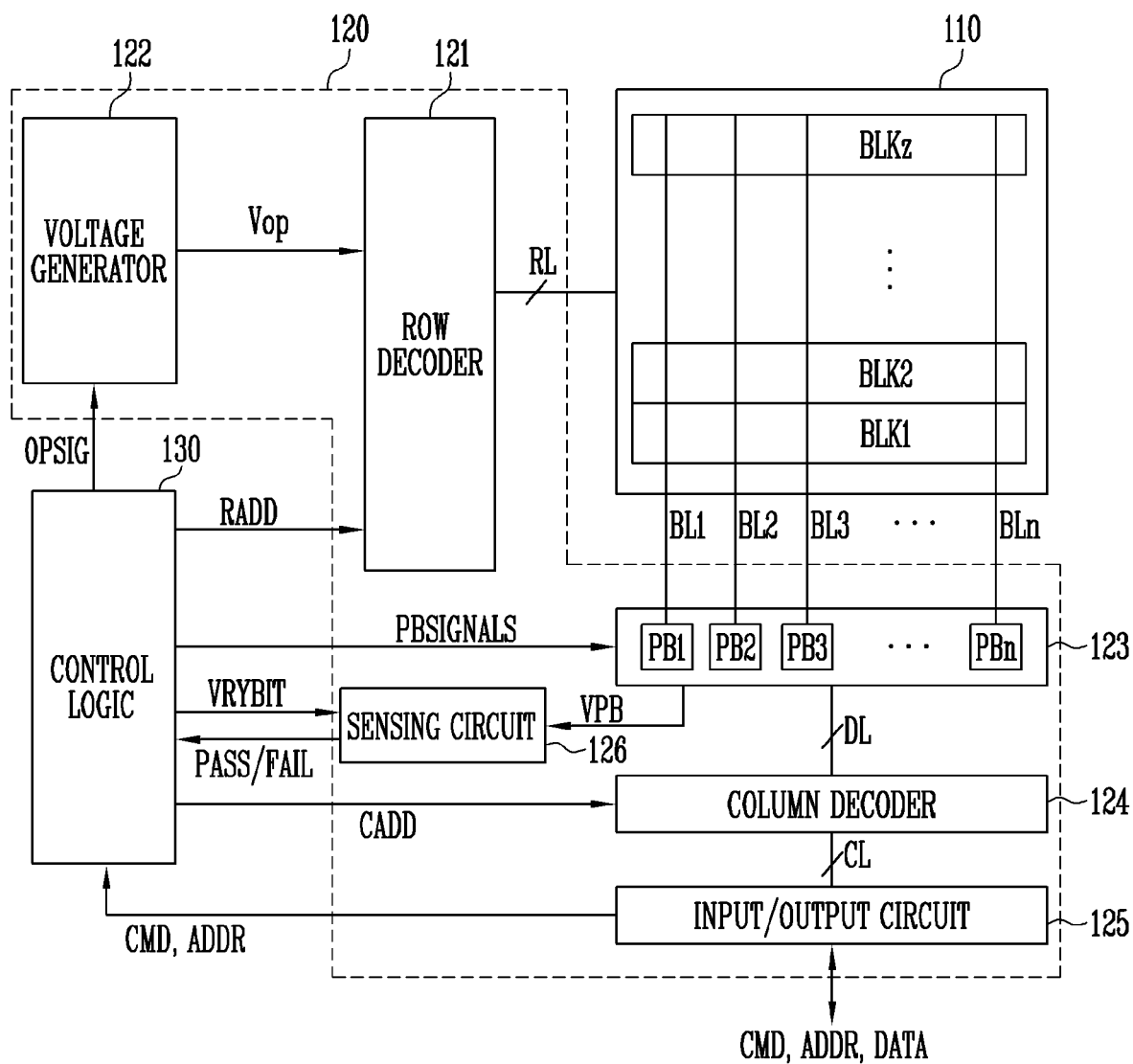
FIG. 10 is a diagram illustrating a structure of a memory device, such as that of FIG. 2.

FIG. 10 is a diagram illustrating a structure of a memory device, such as that of FIG. 2.

Referring to FIG. 10, the memory device 100 may include a memory cell array 110, a peripheral circuit 120, and a control logic 130.

The memory cell array 110 includes a plurality of memory blocks BLK1 to BLKz. The plurality of memory blocks BLK1 to BLKz are coupled to a row decoder 121 through row lines RL. Each of the memory blocks BLK1 to BLKz may be coupled to a page buffer group 123 through bit lines BL1 to BLn. Each of the memory blocks BLK1 to BLKz may include a plurality of memory cells. In an embodiment, the plurality of memory cells may be nonvolatile memory cells. Memory cells coupled to the same word line may be defined as a single page. Therefore, a single memory block may include a plurality of pages.

The row lines RL may include at least one source select line, a plurality of word lines, and at least one drain select line.

Each of the memory cells included in the memory cell array 110 may be implemented as a single-level cell (SLC) capable of storing one data bit or a multi-level cell (MLC) capable of storing two or more data bits. As described above, the MLC may refer to a MLC capable of storing two data bits, a triple-level cell (TLC) capable of storing three data bits, a quadruple-level cell (QLC) capable of storing four data bits, or a memory cell capable of storing five or more data bits.

The peripheral circuit 120 may perform a program operation, a read operation, or an erase operation on a selected area of the memory cell array 110 under the control of the control logic 130. The peripheral circuit 120 may drive the memory cell array 110. For example, the peripheral circuit 120 may apply various operating voltages to the row lines RL and the bit lines BL1 to BLn, or discharge the applied voltages under the control of the control logic 130.

The peripheral circuit 120 may include the row decoder 121, a voltage generator 122, the page buffer group 123, a column decoder 124, and an input/output circuit 125.

The row decoder 121 is coupled to the memory cell array 110 through the row lines RL. The row lines RL may include the at least one source select line, the plurality of word lines, and the at least one drain select line. In an embodiment, the word lines may include normal word lines and dummy word lines. In an embodiment, the row lines RL may further include a pipe select line.

The row decoder 121 may be operated under the control of the control logic 130. The row decoder 121 may receive a row address RADD from the control logic 130.

The row decoder 121 may decode the row address RADD. The row decoder 121 selects at least one of the memory blocks BLK1 to BLKz according to the decoded row address. Further, the row decoder 121 may select at least one word line WL of the selected memory block so that voltages generated by the voltage generator 122 are applied to the at least one word line WL according to the decoded address.

For example, during a program operation, the row decoder 121 may apply a program voltage to a selected word line and apply a program pass voltage having a level lower than that of the program voltage to unselected word lines. During a program verify operation, the row decoder 121 may apply a verify voltage to a selected word line and apply a verify pass voltage higher than the verify voltage to unselected word lines. During a read operation, the row decoder 121 may apply a read voltage to a selected word line and apply a read pass voltage higher than the read voltage to unselected word lines.

In an embodiment, the erase operation of the memory device 100 is performed on a memory block basis. During an erase operation, the row decoder 121 may select one memory block according to the decoded address. During the erase operation, the row decoder 121 may apply a ground voltage to word lines coupled to the selected memory block.

The voltage generator 122 may be operated under the control of the control logic 130. The voltage generator 122 may generate a plurality of voltages using an external supply voltage provided to the memory device 100. In detail, the voltage generator 122 may generate various operating voltages Vop that are used for program, read, and erase operations in response to an operation signal OPSIG. For example, the voltage generator 122 may generate a program voltage, a verify voltage, a pass voltages, a read voltage, an erase voltage, etc. under the control of the control logic 130.

In an embodiment, the voltage generator 122 may generate an internal supply voltage by regulating the external supply voltage. The internal supply voltage generated by the voltage generator 122 is used as an operating voltage for the memory device 100.

In an embodiment, the voltage generator 122 may generate a plurality of voltages using the external supply voltage or the internal supply voltage.

For example, the voltage generator 122 may include a plurality of pumping capacitors for receiving the internal supply voltage and generate a plurality of voltages by selectively enabling the plurality of pumping capacitors under the control of the control logic 130.

The generated voltages may be supplied to the memory cell array 110 by the row decoder 121.

The page buffer group 123 includes first to n-th page buffers PB1 to PBn. The first to n-th page buffers PB1 to PBn are coupled to the memory cell array 110 through the first to n-th bit lines BL1 to BLn. The first to n-th page buffers PB1 to PBn are operated under the control of the control logic 130. In detail, the first to n-th page buffers PB1 to PBn may be operated in response to page buffer control signals PBSIGNALS. For example, the first to n-th page buffers PB1 to PBn may temporarily store data received through the first to n-th bit lines BL1 to BLn or may sense voltages or currents of the bit lines BL1 to BLn during a read or verify operation.

In detail, during a program operation, when a program pulse is applied to the selected word line, the first to n-th page buffers PB1 to PBn may transfer the data DATA, received through the input/output circuit 125, to selected memory cells through the first to n-th bit lines BL1 to BLn. The memory cells in the selected page are programmed based on the received data DATA. Memory cells coupled to a bit line to which a program permission voltage (e.g., a ground voltage) is applied may have increased threshold voltages. The threshold voltages of memory cells coupled to a bit line to which a program inhibition voltage (for example, a supply voltage) is applied may be maintained. During a program verify operation, the first to n-th page buffers PB1 to PBn may read page data from the selected memory cells through the first to n-th bit lines BL1 to BLn.

During a read operation, the first to n-th page buffers PB1 to PBn may read data DATA from the memory cells in the selected page through the first to n-th bit lines BL1 to BLn, and may output the read data DATA to the input/output circuit 125 under the control of the column decoder 124.

During an erase operation, the first to n-th page buffers PB1 to PBn may allow the first to n-th bit lines BL1 to BLn to float.

The column decoder 124 may transfer data between the input/output circuit 125 and the page buffer group 123 in response to a column address CADD. For example, the column decoder 124 may exchange data with the first to n-th page buffers PB1 to PBn through data lines DL or may exchange data with the input/output circuit 125 through column lines CL.

The input/output circuit 125 may transfer a command CMD and an address ADDR, received from the memory controller 200 described above with reference to FIG. 2, to the control logic 130, or may exchange data DATA with the column decoder 124.

During a read operation or a verify operation, the sensing circuit 126 may generate a reference current in response to an enable bit VRYBIT, and may compare a sensing voltage VPB received from the page buffer group 123 with a reference voltage generated by the reference current and then output a pass signal PASS or a fail signal FAIL.

The control logic 130 may control the peripheral circuit 120 by outputting the operation signal OPSIG, the row address RADD, the page buffer control signals PBSIGNALS, and the enable bit VRYBIT in response to the command CMD and the address ADDR. In addition, the control logic 130 may determine whether a verify operation has passed or failed in response to the pass or fail signal PASS or FAIL.

Figure 11:
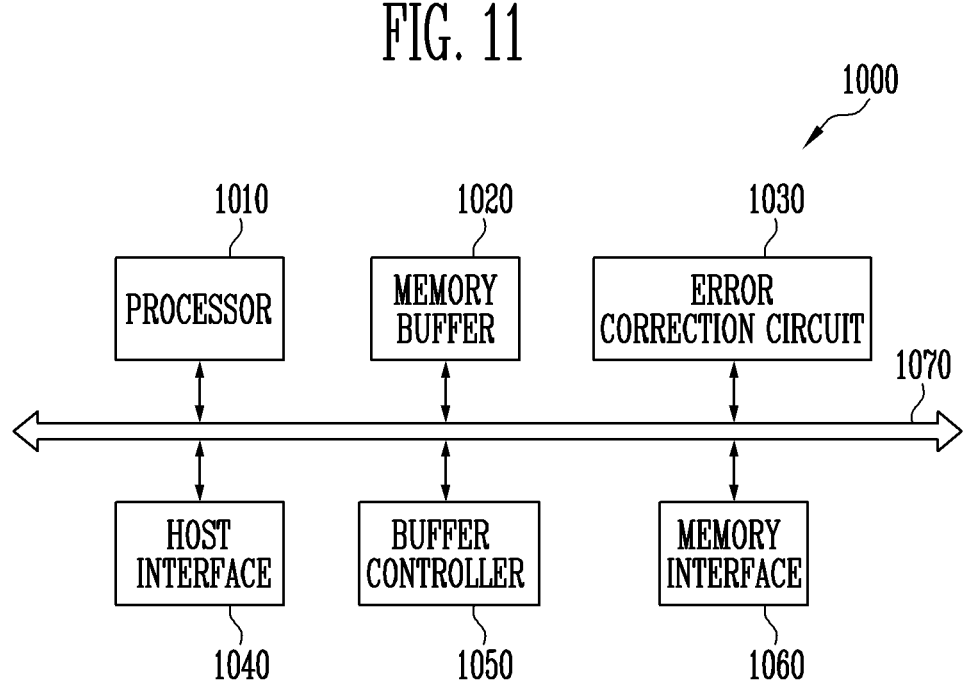
FIG. 11 is a diagram illustrating an embodiment of a memory controller of FIG. 2.

FIG. 11 is a diagram illustrating an embodiment of a memory controller, such as that of FIG. 2.

Referring to FIG. 11, a memory controller 1000 is coupled to a host Host and a memory device. In response to a request from the host Host, the memory controller 1000 may access the memory device. The memory controller 1000 may provide an interface between the memory device and the host Host. The memory controller 1000 may run firmware for controlling the memory device.

The memory controller 1000 may include a processor 1010, a memory buffer 1020, an error correction circuit (ECC) 1030, a host interface 1040, a buffer controller 1050, a memory interface 1060, and a bus 1070.

The bus 1070 may provide channels between components of the memory controller 1000.

The processor 1010 may control the overall operation of the memory controller 1000 and may perform a logical operation. The processor 1010 may communicate with an external host through the host interface 1040 and also communicate with the memory device through the memory interface 1060. Further, the processor 1010 may communicate with the memory buffer 1020 through the buffer controller 1050. The processor 1010 may control the operation of the storage device by using the memory buffer 1020 as a working memory, a cache memory or a buffer memory.

The processor 1010 may perform a function of a flash translation layer (FTL). The processor 1010 may translate a logical address (LA), provided by the host, into a physical address (PA) through the FTL. The FTL may receive the logical address (LA) and translate the LA into the physical address (PA) using a mapping table. Examples of an address mapping method performed through the FTL may include various methods according to a mapping unit. Representative address mapping methods include a page mapping method, a block mapping method, and a hybrid mapping method.

The processor 1010 may randomize data received from the host. For example, the processor 1010 may use a randomizing seed to randomize data received from the host. The randomized data may be provided, as data to be stored, to the memory device and may be programmed in the memory cell array.

The processor 1010 may derandomize data received from the memory device during a read operation. For example, the processor 1010 may derandomize the data received from the memory device using a derandomizing seed. The derandomized data may be output to the host.

In an embodiment, the processor 1010 may run software or firmware to perform the randomizing or derandomizing operation.

The memory buffer 1020 may be used as a working memory, a cache memory, or a buffer memory of the processor 1010. The memory buffer 1020 may store codes and commands executed by the processor 1010. The memory buffer 1020 may store data that is processed by the processor 1010. The memory buffer 1020 may include a static RAM (SRAM) or a dynamic RAM (DRAM).

The error correction circuit 1030 may perform error correction. The error correction circuit 1030 may perform error correction code (ECC) encoding based on data to be written to the memory device through the memory interface 1060. The ECC-encoded data may be transferred to the memory device through the memory interface 1060. The error correction circuit 1030 may perform ECC decoding based on data received from the memory device through the memory interface 1060. In an example, the error correction circuit 1030 may be included as the component of the memory interface 1060 in the memory interface 1060.

The host interface 1040 may communicate with the external host under the control of the processor 1010. The host interface 1040 may perform communication using at least one of various communication methods such as Universal Serial Bus (USB), Serial AT Attachment (SATA), Serial Attached SCSI (SAS), High Speed Interchip (HSIC), Small Computer System Interface (SCSI), Peripheral Component Interconnection (PCI), PCI express (PCIe), Nonvolatile Memory express (NVMe), Universal Flash Storage (UFS), Secure Digital (SD), MultiMedia Card (MMC), embedded MMC (eMMC), Dual In-line Memory Module (DIMM), Registered DIMM (RDIMM), and Load Reduced DIMM (LRDIMM) communication methods.

The buffer controller 1050 may control the memory buffer 1020 under the control of the processor 1010.

The memory interface 1060 may communicate with the memory device under the control of the processor 1010. The memory interface 1060 may transmit/receive commands, addresses, and data to/from the memory device through channels.

In an embodiment, the memory controller 1000 may not include the memory buffer 1020 and the buffer controller 1050.

In an embodiment, the processor 1010 may control the operation of the memory controller 1000 using codes. The processor 1010 may load codes from a nonvolatile memory device (e.g., ROM) provided in the memory controller 1000. In an embodiment, the processor 1010 may load codes from the memory device through the memory interface 1060.

In an embodiment, the bus 1070 of the memory controller 1000 may be divided into a control bus and a data bus. The data bus may be configured to transmit data in the memory controller 1000, and the control bus may be configured to transmit control information such as commands or addresses in the memory controller 1000. The data bus and the control bus may be isolated from each other, and may neither interfere with each other nor influence each other. The data bus may be coupled to the host interface 1040, the buffer controller 1050, the error correction circuit 1030, and the memory interface 1060. The control bus may be coupled to the host interface 1040, the processor 1010, the buffer controller 1050, the memory buffer 1020, and the memory interface 1060.

Figure 12:
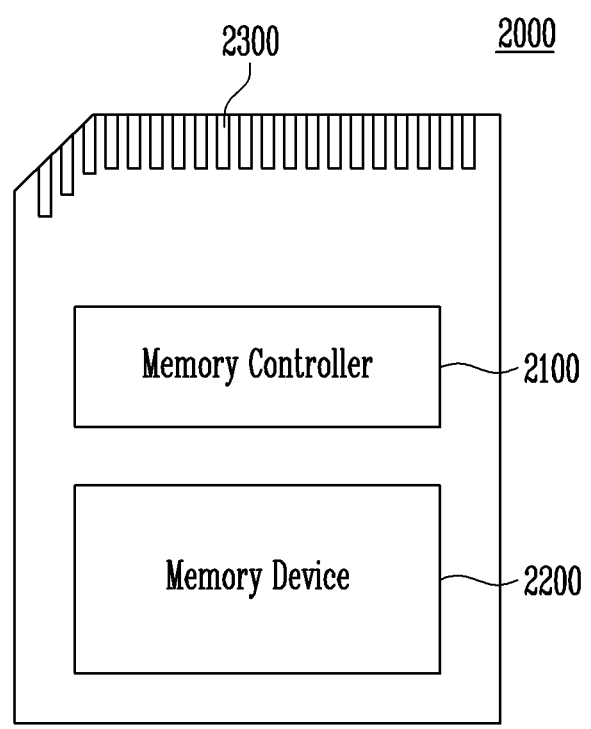
FIG. 12 is a block diagram illustrating a memory card system to which a storage device according to an embodiment of the present disclosure is applied.

FIG. 12 is a block diagram illustrating a memory card system to which the storage device according to an embodiment of the present disclosure is applied.

Referring to FIG. 12, a memory card system 2000 may include a memory controller 2100, a memory device 2200, and a connector 2300.

The memory controller 2100 is coupled to the memory device 2200. The memory controller 2100 may access the memory device 2200. The memory controller 2100 may be implemented in the same way as the memory controller 200 described above with reference to FIG. 2.

In an embodiment, the memory controller 2100 may include components, such as a RAM, a processor, a host interface, a memory interface, and an error correction circuit.

The memory controller 2100 may communicate with an external device through the connector 2300. The memory controller 2100 may communicate with an external device (e.g., a host) based on a specific communication protocol. In an embodiment, the memory controller 2100 may communicate with the external device through at least one of various communication protocols such as universal serial bus (USB), multimedia card (MMC), embedded MMC (eMMC), peripheral component interconnection (PCI), PCI-express (PCI-E), advanced technology attachment (ATA), serial-ATA (SATA), parallel-ATA (PATA), small computer system interface (SCSI), enhanced small disk interface (ESDI), integrated drive electronics (IDE), Firewire, universal flash storage (UFS), Wi-Fi, Bluetooth, and nonvolatile memory express (NVMe) protocols. In an embodiment, the connector 2300 may be defined by at least one of the above-described various communication protocols.

In an embodiment, the memory device 2200 may be implemented as any of various nonvolatile memory devices, such as an Electrically Erasable and Programmable ROM (EEPROM), a NAND flash memory, a NOR flash memory, a Phase-change RAM (PRAM), a Resistive RAM (Re-RAM), a Ferroelectric RAM (FRAM), a Spin Transfer Torque Magnetic RAM (STT-MRAM).

The memory controller 2100 and the memory device 2200 may be integrated into a single semiconductor device to configure a memory card. For example, the memory controller 2100 and the memory device 2200 may be integrated into a single semiconductor device to configure a memory card such as a PC card (personal computer memory card international association: PCMCIA), a compact flash (CF) card, a smart media card (SM or SMC), a memory stick, a multimedia card (MMC, RS-MMC, MMCmicro or eMMC), a SD card (SD, miniSD, microSD, or SDHC), or a universal flash storage (UFS).

Figure 13:
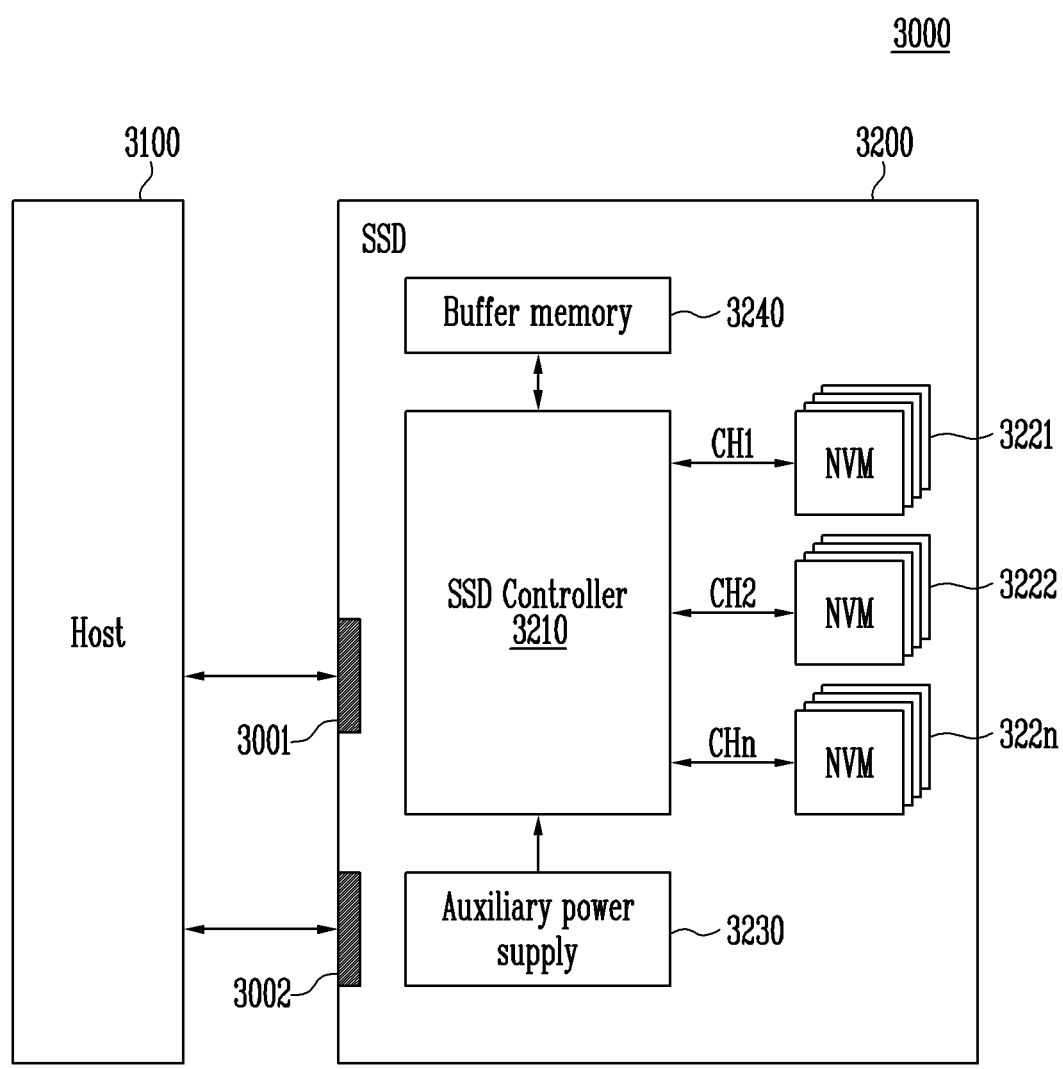
FIG. 13 is a block diagram illustrating a solid state drive (SSD) system to which a storage device according to an embodiment of the present disclosure is applied.

FIG. 13 is a block diagram illustrating a solid state drive (SSD) system to which a storage device according to an embodiment of the present disclosure is applied.

Referring to FIG. 13, an SSD system 3000 may include a host 3100 and an SSD 3200. The SSD 3200 may exchange a signal SIG with the host 3100 through a signal connector 3001, and may receive power PWR through a power connector 3002. The SSD 3200 may include an SSD controller 3210, a plurality of nonvolatile memories 3221 to 322n, an auxiliary power supply 3230, and a buffer memory 3240.

In accordance with an embodiment of the present disclosure, the SSD controller 3210 may perform the function of the memory controller 200, described above with reference to FIG. 2.

The SSD controller 3210 may control the plurality of nonvolatile memories 3221 to 322n in response to the signal SIG received from the host 3100. In an embodiment, the signal SIG may indicate signals based on the interfaces of the host 3100 and the SSD 3200. For example, the signal SIG may be a signal defined by at least one of various interfaces such as universal serial bus (USB), multimedia card (MMC), embedded MMC (eMMC), peripheral component interconnection (PCI), PCI-express (PCI-E), an advanced technology attachment (ATA), serial-ATA (SATA), parallel-ATA (PATA), small computer system interface (SCSI), enhanced small disk interface (ESDI), integrated drive electronics (IDE), firewire, universal flash storage (UFS), WiFi, Bluetooth, and nonvolatile memory express (NVMe) interfaces.

The auxiliary power supply 3230 may be coupled to the host 3100 through the power connector 3002. The auxiliary power supply 3230 may be supplied with power PWR from the host 3100 and may be charged. The auxiliary power supply 3230 may supply the power of the SSD 3200 when the supply of power from the host 3100 is not smoothly performed. In an embodiment, the auxiliary power supply 3230 may be positioned inside the SSD 3200 or positioned outside the SSD 3200. For example, the auxiliary power supply 3230 may be disposed in a main board and may supply auxiliary power to the SSD 3200.

The buffer memory 3240 functions as a buffer memory of the SSD 3200. For example, the buffer memory 3240 may temporarily store data received from the host 3100 or data received from the plurality of flash memories 3221 to 322n or may temporarily store metadata (e.g., mapping tables) of the nonvolatile memories 3221 to 322n. The buffer memory 3240 may include volatile memories such as DRAM, SDRAM, DDR SDRAM, LPDDR SDRAM, and GRAM or nonvolatile memories such as FRAM, ReRAM, STT-MRAM, and PRAM.

Figure 14:
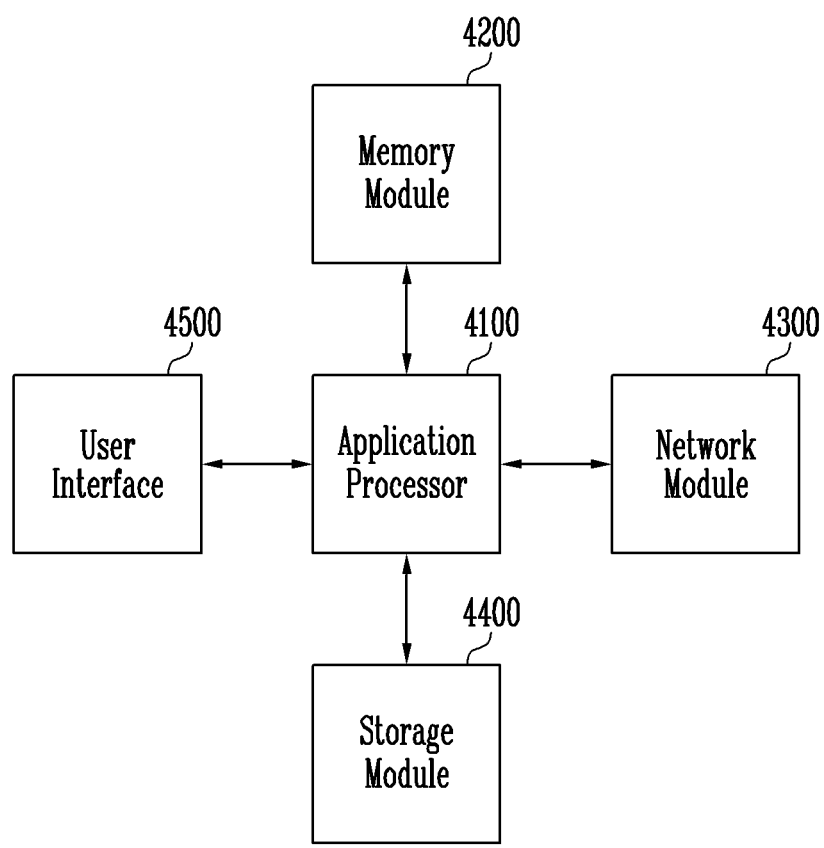
FIG. 14 is a block diagram illustrating a user system to which a storage device according to an embodiment of the present disclosure is applied.

FIG. 14 is a block diagram illustrating a user system to which the storage device according to an embodiment of the present disclosure is applied.

Referring to FIG. 14, a user system 4000 may include an application processor 4100, a memory module 4200, a network module 4300, a storage module 4400, and a user interface 4500.

The application processor 4100 may run components included in the user system 4000, an Operating System (OS) or a user program. In an embodiment, the application processor 4100 may include controllers, interfaces, graphic engines, etc. for controlling the components included in the user system 4000. The application processor 4100 may be provided as a system-on-chip (SoC).

The memory module 4200 may function as a main memory, a working memory, a buffer memory or a cache memory of the user system 4000. The memory module 4200 may include volatile RAMs such as DRAM, SDRAM, DDR SDRAM, DDR2 SDRAM, DDR3 SDRAM, LPDDR SDRAM, LPDDR2 SDRAM, and LPDDR3 SDRAM, or nonvolatile RAMs such as PRAM, ReRAM, MRAM, and FRAM. In an embodiment, the application processor 4100 and the memory module 4200 may be packaged based on package-on-package (POP) and may then be provided as a single semiconductor package.

The network module 4300 may communicate with external devices. For example, the network module 4300 may support wireless communication, such as Code Division Multiple Access (CDMA), Global System for Mobile communication (GSM), wideband CDMA (WCDMA), CDMA-2000, Time Division Multiple Access (TDMA), Long Term Evolution (LTE), WiMAX, WLAN, UWB, Bluetooth, or Wi-Fi communication. In an embodiment, the network module 4300 may be included in the application processor 4100.

The storage module 4400 may store data. For example, the storage module 4400 may store data received from the application processor 4100. Alternatively, the storage module 4400 may transmit the data stored in the storage module 4400 to the application processor 4100. In an embodiment, the storage module 4400 may be implemented as a nonvolatile semiconductor memory device, such as a Phase-change RAM (PRAM), a Magnetic RAM (MRAM), a Resistive RAM (RRAM), a NAND flash memory, a NOR flash memory, or a NAND flash memory having a three-dimensional (3D) structure. In an embodiment, the storage module 4400 may be provided as a removable storage medium (i.e., removable drive), such as a memory card or an external drive of the user system 4000.

In an embodiment, the storage module 4400 may include a plurality of nonvolatile memory devices, each of which may be operated in the same way as the memory device 100 described above with reference to FIG. 2. The storage module 4400 may be operated in the same way as the storage device 50 described above with reference to FIG. 2.

The user interface 4500 may include interfaces which input data or instructions to the application processor 4100 or output data to an external device. In an embodiment, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric device. The user interface 4500 may further include user output interfaces such as a Liquid Crystal Display (LCD), an Organic Light Emitting Diode (OLED) display device, an Active Matrix OLED (AMOLED) display device, an LED, a speaker, and a monitor.

In accordance with the present disclosure, there are provided a storage node of a distributed storage system and a method of operating the storage node, which may more efficiently manage data.

Examples of embodiments have been disclosed herein, and although specific terms are employed, the terms are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A memory controller for controlling an operation of a memory device, comprising:
   a data controller configured to:
   receive a write request requesting the memory device to store write data from a host, and determine a physical address of a memory block in which the write data is to be stored based on chunk type information included in the write request; and
   a memory control component configured to provide a program command for instructing the memory block to store the write data, the physical address, and the write data to the memory device,
   wherein the chunk type information indicates a type of the write data which is one of a data chunk and a coding chunk, the data chunk and the coding chunk being generated by the host performing an erasure coding operation on original data.

2. The memory controller according to claim 1, wherein the data controller determines the physical address by determining, if the write data is the data chunk, a first memory block to be a memory block in which the write data is to be stored.

3. The memory controller according to claim 2, wherein a memory cell included in the first memory block is programmed to store two or more data bits.

4. The memory controller according to claim 1, wherein the data controller determines the physical address by determining, if the write data is the coding chunk, a second memory block to be a memory block in which the write data is to be stored.

5. The memory controller according to claim 4, wherein a memory cell included in the second memory block is programmed to store one data bit.

6. The memory controller according to claim 1, wherein:
   the data controller determines the physical address to store the data chunk in a first memory block and to store the coding chunk in a second memory block, and
   wherein a number of data bits stored in a single memory cell included in the first memory block is less than a number of data bits stored in a single memory cell included in the second memory block.

7. The memory controller according to claim 1, wherein sizes of the data chunks and the coding chunks are smaller than that of the original data.

8. The memory controller according to claim 1, wherein the original data is recovered from a preset number of chunks among the data chunks and the coding chunks.

9. A memory controller for controlling an operation of a memory device, comprising:
   a data controller configured to receive a write request requesting the memory device to store write data from a host;
   an error correction circuit configured to perform an error correction encoding operation on the write data based on chunk type information included in the write request; and
   a memory control component configured to provide the memory device with a program command for instructing program data, which is the encoded write data, to be stored in the memory device,
   wherein the chunk type information indicates a type of the write data, which is one of a data chunk and a coding chunk, the data chunk and the coding chunk being generated by the host performing an erasure coding operation on original data.

10. The memory controller according to claim 9, wherein the error correction circuit performs the error correction encoding operation of encoding, if the write data is the data chunk, the write data using a first error correction code and encoding, if the write data is the coding chunk, the write data using a second error correction code.

11. The memory controller according to claim 10, wherein the first error correction code has smaller capability of error correction, compared to the error correction capability of the second error correction code.

12. The memory controller according to claim 9, wherein the error correction circuit performs the error correction encoding operation only on the coding chunk.

13. The memory controller according to claim 9, wherein the data controller determines a physical address of a memory block in which the write data is to be stored based on the chunk type information included in the write request.

14. The memory controller according to claim 13, wherein the data controller determines the physical address by determining, if the write data is the data chunk, a first memory block to be a memory block in which the write data is to be stored.

15. The memory controller according to claim 14, wherein a memory cell included in the first memory block is programmed to store two or more data bits.

16. The memory controller according to claim 13, wherein the data controller determines the physical address by determining, if the write data is the coding chunk, a second memory block to be a memory block in which the write data is to be stored.

17. The memory controller according to claim 16, wherein a memory cell included in the second memory block is programmed to store one data bit.

18. The memory controller according to claim 13, wherein:
   the data controller determines the physical address to store the data chunk in a first memory block and to store the coding chunk in a second memory block, and
   wherein a number of data bits stored in a single memory cell included in the first memory block is less than a number of data bits stored in a single memory cell included in the second memory block.

19. The memory controller according to claim 9, wherein sizes of the data chunks and the coding chunks are smaller than that of the original data, and
   wherein the original data is recovered from a preset number of chunks among the data chunks and the coding chunks.

20. A method of operating a memory controller, the memory controller receiving write data and a write request from a host and controlling an operation of a memory device, the method comprising:
   determining, based on chunk type information included in the write request, whether the write data is a data chunk or a coding chunk;
   performing one of first error correction and second error correction on the write data depending on whether the write data is the data chunk or the coding chunk; and controlling the memory device so that the write data is stored in one of a first memory block and a second memory block included in the memory device depending on whether the write data is the data chunk or the coding chunk.

* * * * *